(12) United States Patent
Kaganoi

(10) Patent No.: US 6,425,048 B1
(45) Date of Patent: Jul. 23, 2002

(54) MEMORY POOL CONTROL CIRCUIT AND MEMORY POOL CONTROL METHOD

(75) Inventor: Teruo Kaganoi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/472,038

(22) Filed: Dec. 27, 1999

(30) Foreign Application Priority Data

Jan. 6, 1999 (JP) .......................................... 11-000997

(51) Int. Cl.[7] .............................................. G06F 12/14
(52) U.S. Cl. ...................... 711/108; 711/153; 711/156; 711/152
(58) Field of Search ................................ 711/128, 144, 711/145, 150, 151, 152, 129, 153, 163, 170, 173, 219, 208, 209, 202, 120, 108, 156

(56) References Cited

U.S. PATENT DOCUMENTS

| | | | | |
|---|---|---|---|---|
| 4,961,139 A | * | 10/1990 | Hong et al. ..................... | 707/1 |
| 5,291,442 A | * | 3/1994 | Emma et al. ................. | 711/120 |
| 5,488,706 A | * | 1/1996 | Wendorf et al. ............... | 710/5 |
| 5,727,178 A | * | 3/1998 | Pletcher et al. ............. | 711/202 |
| 5,737,547 A | * | 4/1998 | Zuravleff et al. ........... | 710/712 |
| 5,946,711 A | * | 8/1999 | Donnelly ..................... | 711/152 |

FOREIGN PATENT DOCUMENTS

| | | |
|---|---|---|
| JP | A 62-118454 | 5/1987 |
| JP | A 3-92941 | 4/1991 |
| JP | A 5-189299 | 7/1993 |

* cited by examiner

Primary Examiner—B. James Peikari
(74) Attorney, Agent, or Firm—Young & Thompson

(57) ABSTRACT

A memory pool control circuit according to the invention is provided with a CAM (content addressable memory: associative memory) 11. It further has a monitoring module 12, an area unlocking module 13, a local accessing module 14, an area locking module 15, a search control machine 16, and a timer 17. A plurality of tasks (processes) are operating on a processor 18, and one memory 19 is commonly used by the plurality of tasks (processes). When a task (process) has secured a memory space (called a block here), free areas therein are managed by a group of pointers. A block is divided into a plurality of fixed length fields. A group of flags match the memory space (block) in one-to-one correspondence. The flag group indicate whether or not individual fields are being used, i.e. the flag group indicates whether each individual field is being used or unused (free).

13 Claims, 9 Drawing Sheets

MEMORY POOL CONTROL CIRCUIT AND MEMORY POOL CONTROL METHOD

BACKGROUND OF THE INVENTION

1. Field of the Invention

The present invention relates to a memory pool control circuit and a memory pool control method, and more particularly to a memory pool control circuit and a memory pool control method for managing a shared memory.

2. Description of the Related Art

Various systems in which a plurality of processors or tasks (processes) use one shared memory are commonly known. In such a system, it is required to appropriately manage the shared memory.

According to the prior art, in managing a shared memory, memory areas are locked according to the requests of tasks, and it is so arranged that any memory area that is vacated be unlocked.

In order to effectively utilize memory areas, there is used a configuration in which a plurality of fixed length fields are put together into a unit (block), and each block is locked as a memory area. In this case, each field in a block may be occupied or unoccupied. Moreover, it is difficult to determine whether a given field in a block is occupied or unoccupied. As a result, even if all the fields in a block become unoccupied, it is difficult to unlock an intended block. Thus, it is difficult to judge whether or not a secured memory area can be appropriately unlocked, resulting in a problem that, once a memory area is locked, the memory area cannot be unlocked.

SUMMARY OF THE INVENTION

An object of the present invention is to provide a memory pool control circuit and a memory pool control method which readily allows to confirm whether or not a given memory area can be appropriately unlocked even where a plurality of fixed length fields put together into a unit (block) and each block is locked as a memory area.

A memory pool control circuit according to the invention, intended for managing a shared memory divided into memory spaces each having a predetermined plurality of fields, is provided with a content addressable memory for storing pointers for managing free areas in a shared memory and storing flags for indicating, for each field, whether or not the field is being used; an area securing circuit for locking a memory space as a locked memory space in compliance with an access to the shared memory and updating the pointers in the content addressable memory; a local access circuit for erecting flags in the content addressable memory according to the state of use of fields in the locked memory space; and an area releasing circuit for searching the content addressable memory and unlocking the locked memory space if all the fields therein are found free.

A memory pool control method according to the invention, intended for managing a shared memory divided into memory spaces each having a predetermined plurality of fields, comprises an associative storage step to store pointers for managing free areas in a shared memory and flags for indicating, for each field, whether or not the field is being used; an area securing step to lock a memory space as a locked memory space in compliance with an access to the shared memory and to update the aforementioned pointers; a local accessing step to update the flags in the content addressable memory according to the state of use of fields in the locked memory space; and an area releasing step to search the flags and to unlock the locked memory space if all the fields therein are found free.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

The present invention will be described below in detail with reference to the accompanying drawings.

Figure 1:
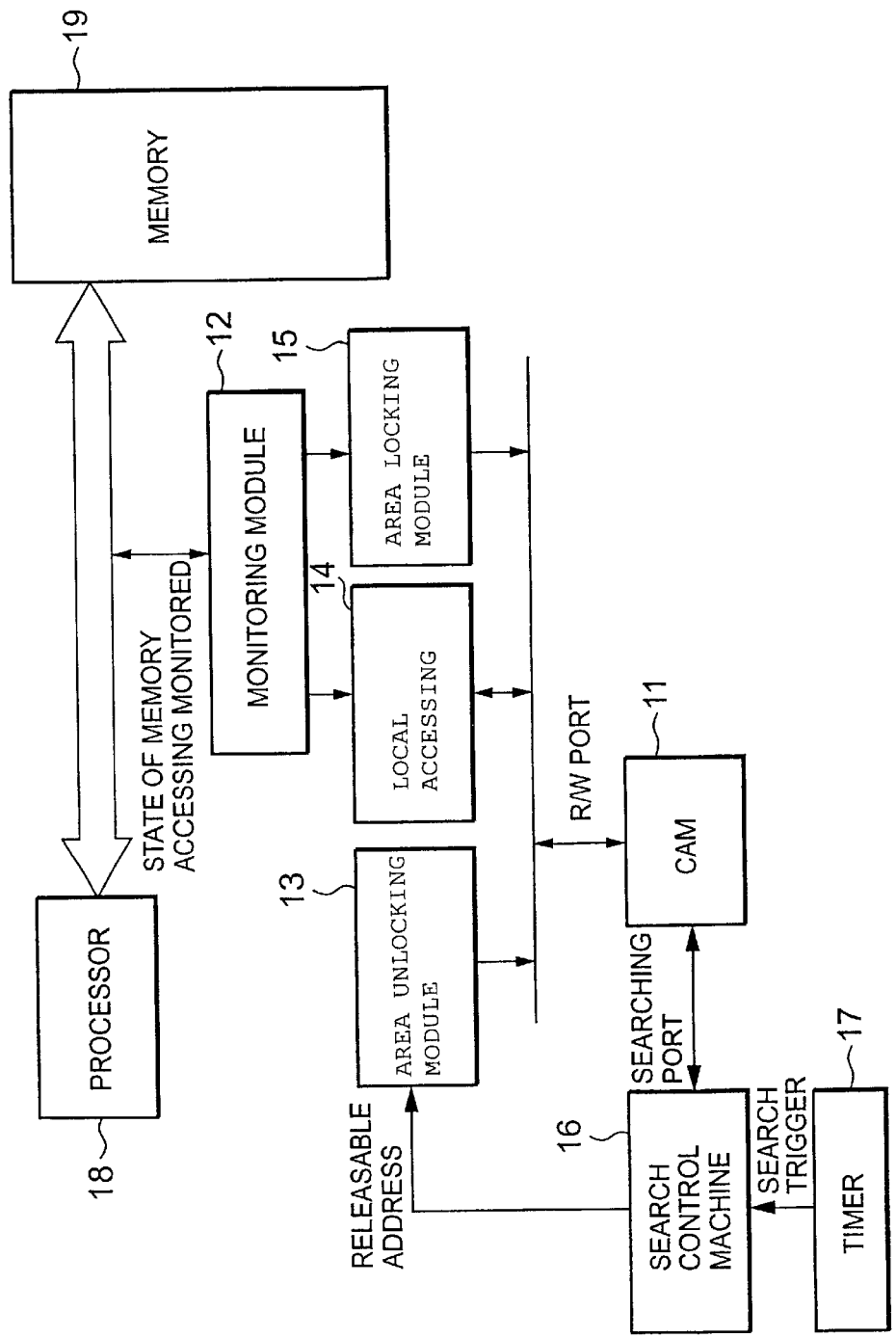
FIG. 1 is a block diagram illustrating one example of memory pool control circuit according to the present invention.

First, one example of memory pool control circuit according to the invention will be described with reference to FIG. 1. The memory pool control circuit of FIG. 1 is provided with a CAM (content addressable memory: associative memory) 11. The memory pool control circuit further has a monitoring module 12, an area releasing module 13, an in-area accessing module 14, an area securing module 15, a search control machine 16, and a timer 17. In the configuration of FIG. 1, a plurality of tasks (processes) are operating on a processor 18, and one memory 19 is commonly used by this plurality of tasks (processes).

Now, with reference also to FIG. 2, when a tasks (process) has locked a memory space (called a block here), free areas therein are managed by a group of pointers (hereinafter called block managing pointers) 1-1. A block 1-2 is divided into a plurality of fixed length fields. A group of flags match the memory space (block) 1-2 in one-to-one correspondence. The flag group 1-3 indicates whether or not individual fields are being used, i.e. the flag group 1-3 indicates whether each individual field is being used or unused (free).

Here, as will be described later, the flag group 1-3 is stored in the CAM 11 together with the block managing pointer, and its size (number of words) is made to be sufficiently for the number of areas to be locked. Further in the pointer group 1-1, (at least) as many block managing pointers as required are readied. In the example shown in FIG. 2, 64 block managing pointers are prepared. As stated above, the block 1-2 is divided into a plurality of fixed length fields, and in each of the fixed length fields is present a pointer for pointing to the next free field.

Figure 3:
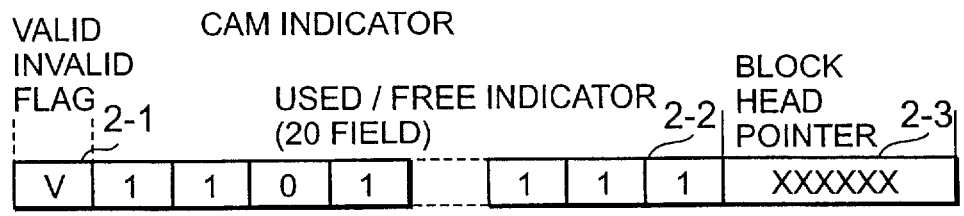
FIG. 3 is a diagram illustrating the data format in the CAM shown in FIG. 1.

FIG. 3 shows the data format in the CAM (CAM indicator). As illustrated, the CAM indicator has a flag (valid/invalid flag) 2-1 indicating whether or not a pertinent word is valid or invalid, a flag (used/free indicator) 2-2 indicating whether each field in the block is being used or free, and a pointer (block head pointer) 2-3 indicating the actual position of the memory space matching the flag represented by the pertinent word.

Figure 2:
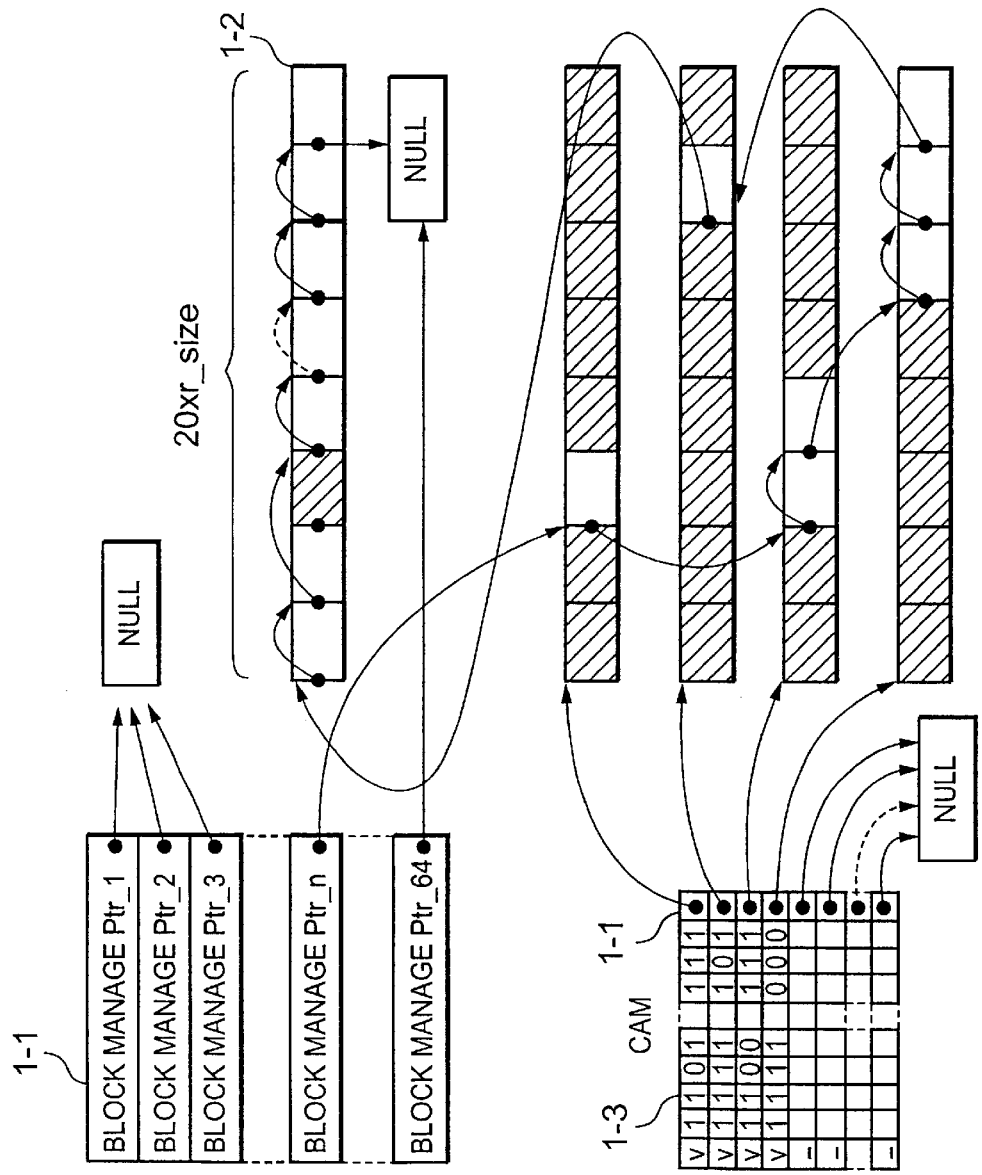
FIG. 2 is a diagram illustrating the method of memory pool management in the memory pool control circuit shown in FIG. 1.

Referring to FIGS. 1 through 3, how a memory area is locked and unlocked by a single task (process) where a plurality of tasks (processes) commonly use a shared memory space will be described.

Every time a task on the processor 18 accesses the memory 19, the monitoring module 12 is monitoring the state of accessing. And the monitoring module 12 provides the memory state of accessing to the in-area accessing module 14 and the area securing module 15.

Figure 4:
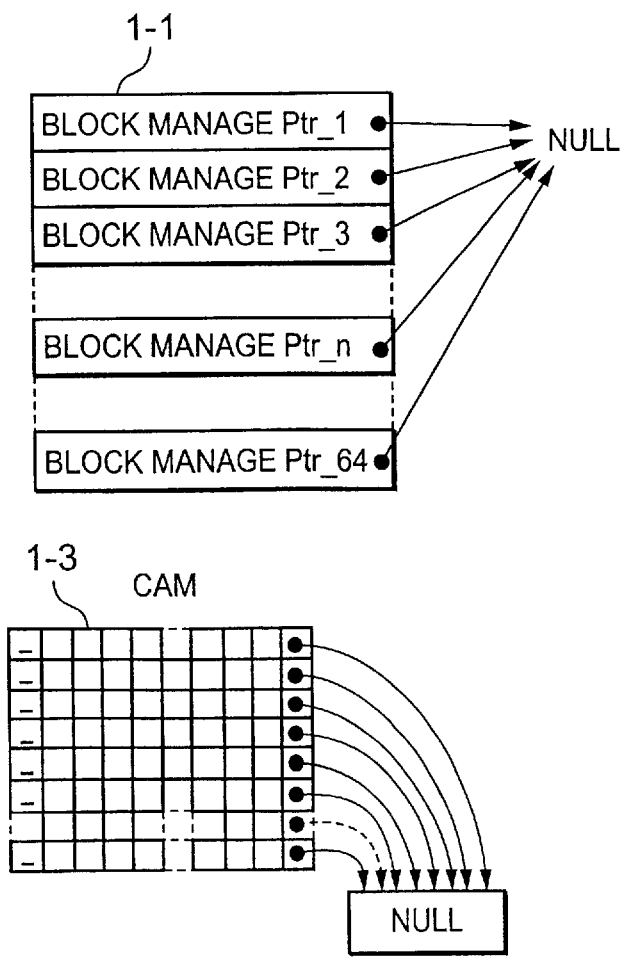
FIG. 4 is a diagram illustrating the state at the time of initialization.

Areas are locked in units of memory spaces (blocks) each consisting of a plurality (20 in the example of FIG. 2) of consecutive fixed length fields. Now it is supposed the size of a field to be locked is a predetermined value (r_size). At the time of initialization, all the block managing pointers 1-1 indicate NULL (invalid), the whole CAM 1-3 is in an INVALID (unused) state, and all the pointers 2-3 also indicate NULL (see FIG. 4).

Now if a task n requires a memory space of r_size bytes, i.e. the monitoring module 12 becomes aware of the state of the use of the memory space by the task n, the area securing module 15 accesses the CAM 11 to lock one block of areas for a plurality of (20 here) consecutive r_size fields, and causes the pointer of each field in the block to point to the next field. As the first field in the locked area is used, the n-th block managing pointer points to the first unused space in the block (the second field from the left in FIG. 2).

Figure 5:
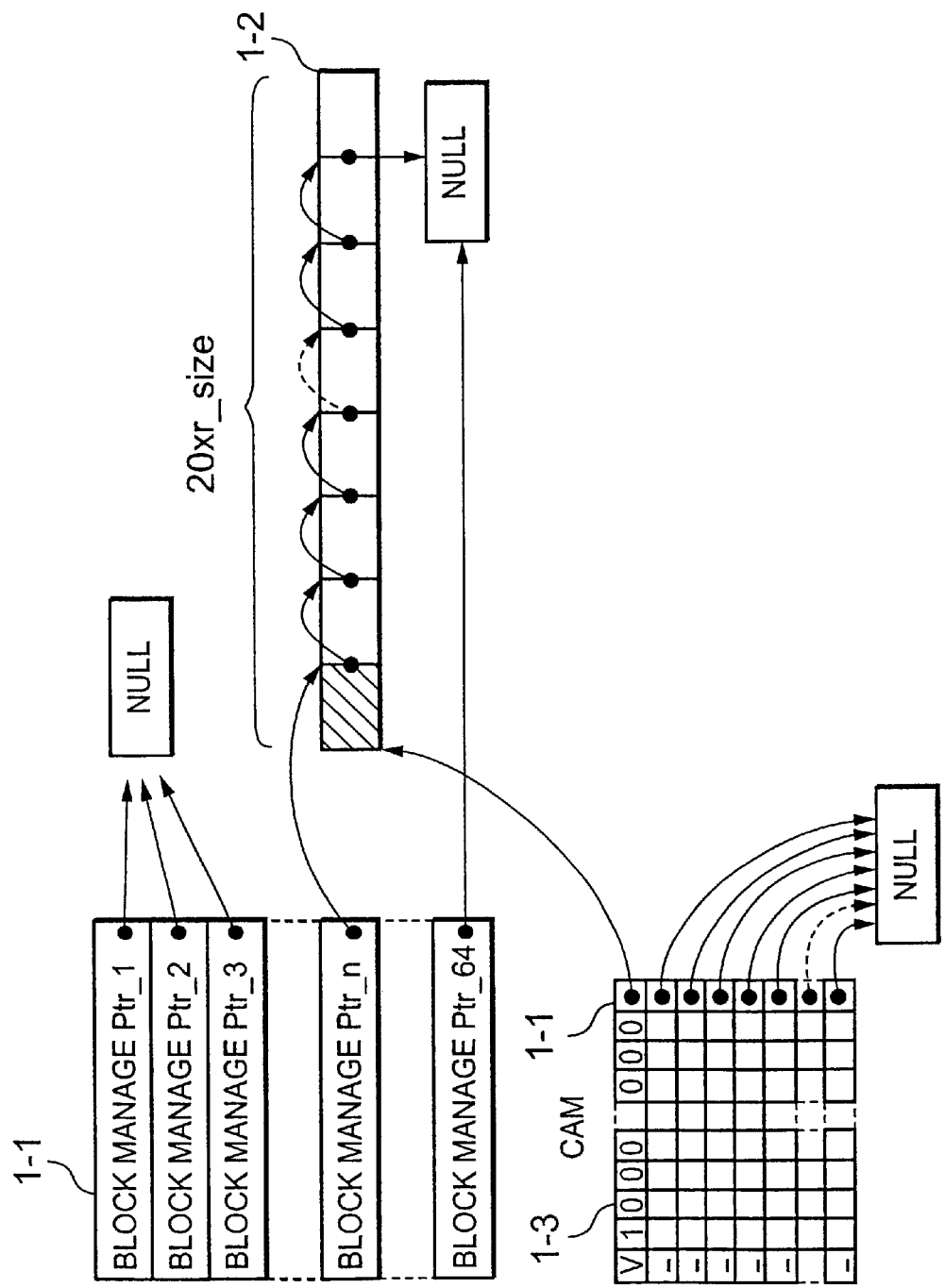
FIG. 5 is a diagram illustrating the state of use of fields in a block.

When one block is locked, the local accessing module 14 validates one word in the CAM 11, and writes into the pointer field thereof the address of the initial position of the secured block. Further the local accessing module 14 sets a flag according to the state of use of fields in the block (here "1" is set in the first field: see FIG. 5).

When a memory space so far used is vacated, the in-area accessing module 14 points the vacated field with the n-th block managing pointer, and writes the address so far indicated by the n-th block managing pointer into the pointer part of the vacated field. Thus the vacated field is inserted into the initial position of the list structure managing free fields composed of the n-th block managing pointer.

Figure 6:
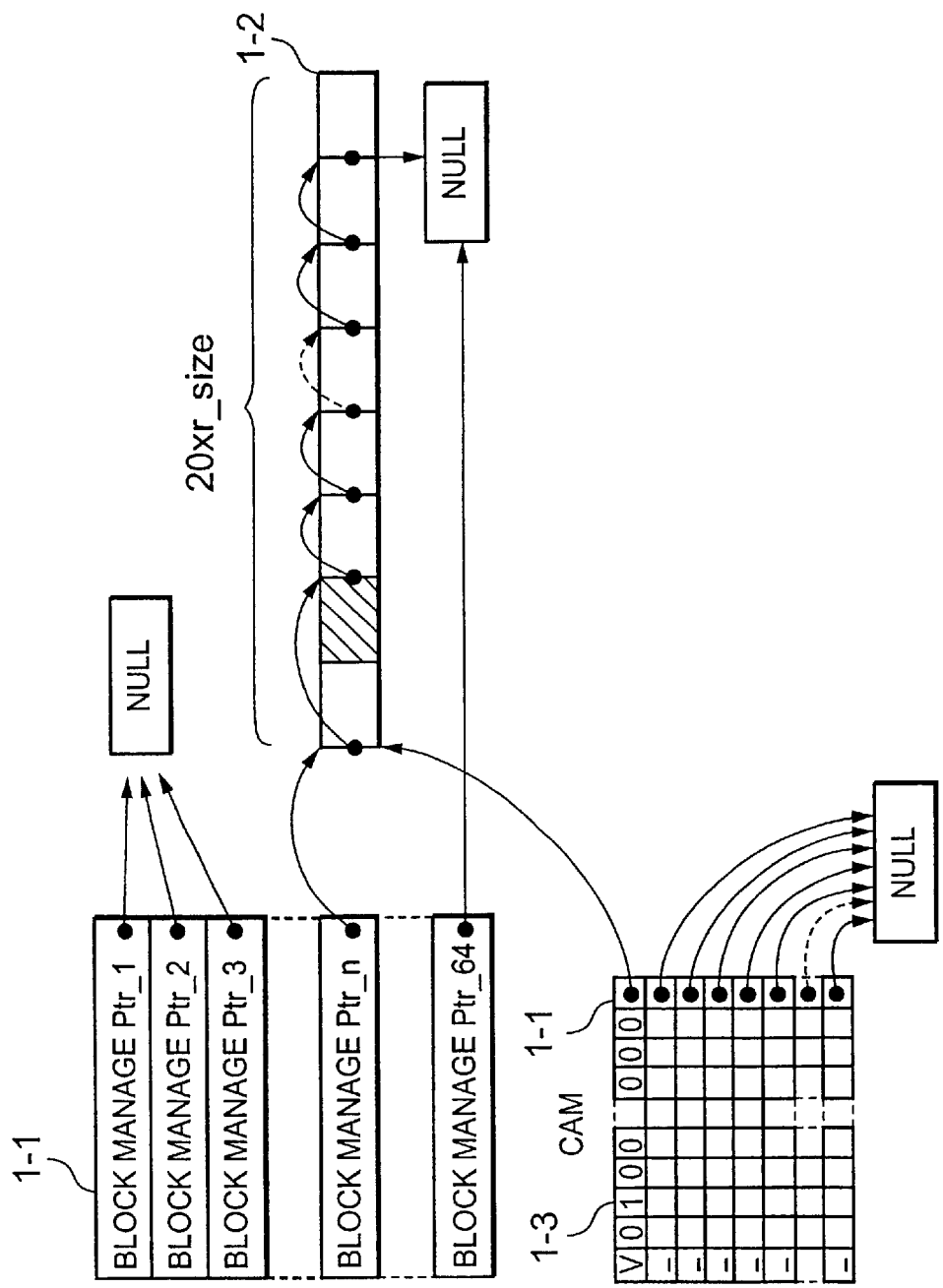
FIG. 6 is a diagram illustrating fields having come out of use in a block.

Further, the in-area accessing module 14 turns the used/free flag for the pertinent field on the CAM into a free state (see FIG. 6). FIG. 6 shows a case in which the first and second fields in the block have been used and the first field is vacated.

Figure 7:
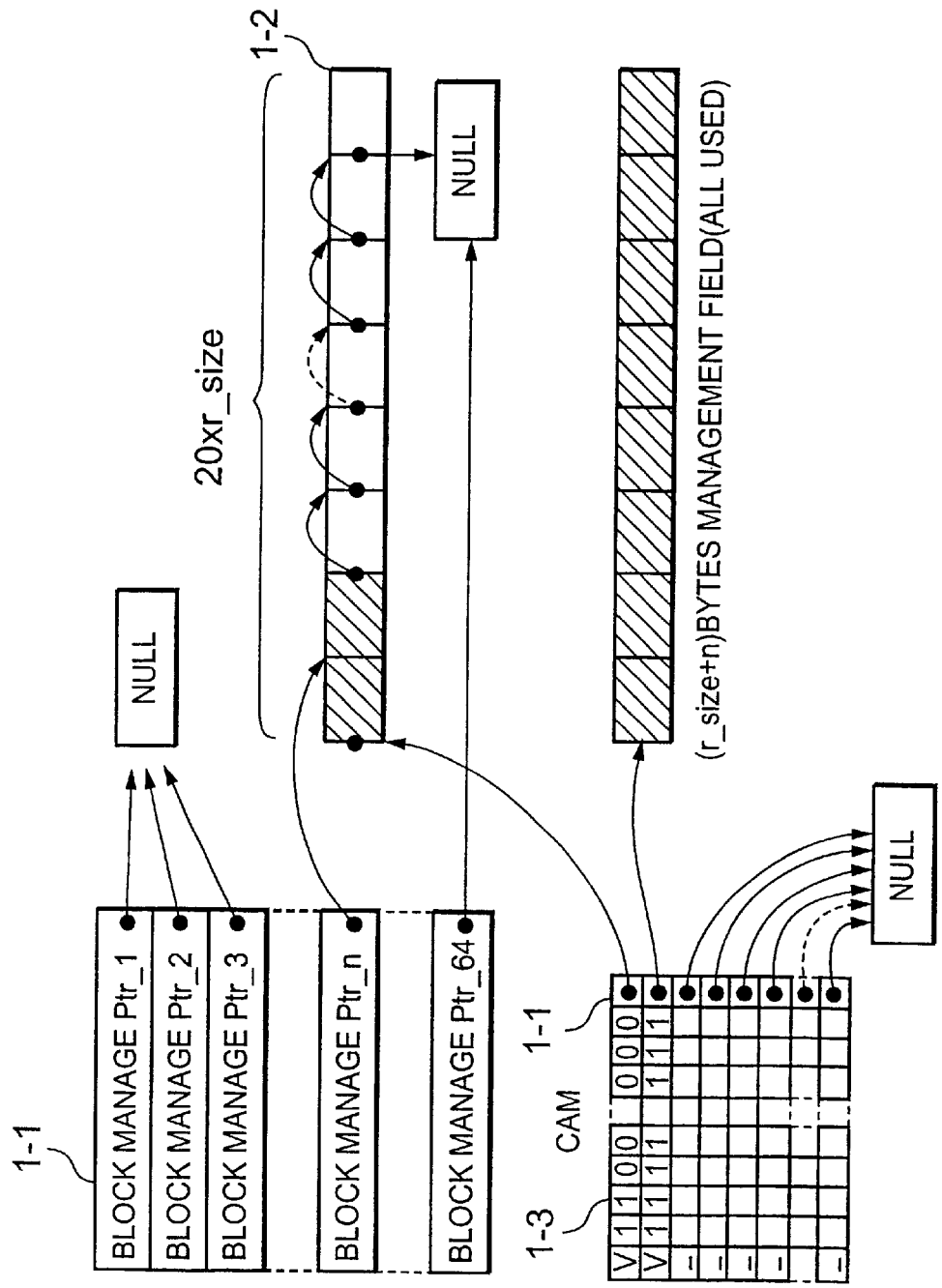
FIG. 7 is a diagram illustrating the state of use of fields in a block.

Now, when all the whole area (block) locked by a task have come into use, a new block is made ready. As stated above, one block of area consisting of a plurality (20 here) of r_size fields are locked, and the pointer of each field in the block is caused to point to the next field. Used fields in the locked area are skipped, and the n-th block managing pointer points to the first unused space in the locked block. As soon as the block is locked, one new word in the CAM is validated, and the address of the first position of the secured block is written into the pointer field therein. Further, a flag is set according to the state of use of fields in the block (see FIG. 7). Then, by repeating the above-described actions, the state illustrated in FIG. 2 is achieved.

When a secured area (block) is to be unlocked in such a state, the searching function of the CAM is used to check whether or not the block can be unlocked.

Figure 8:
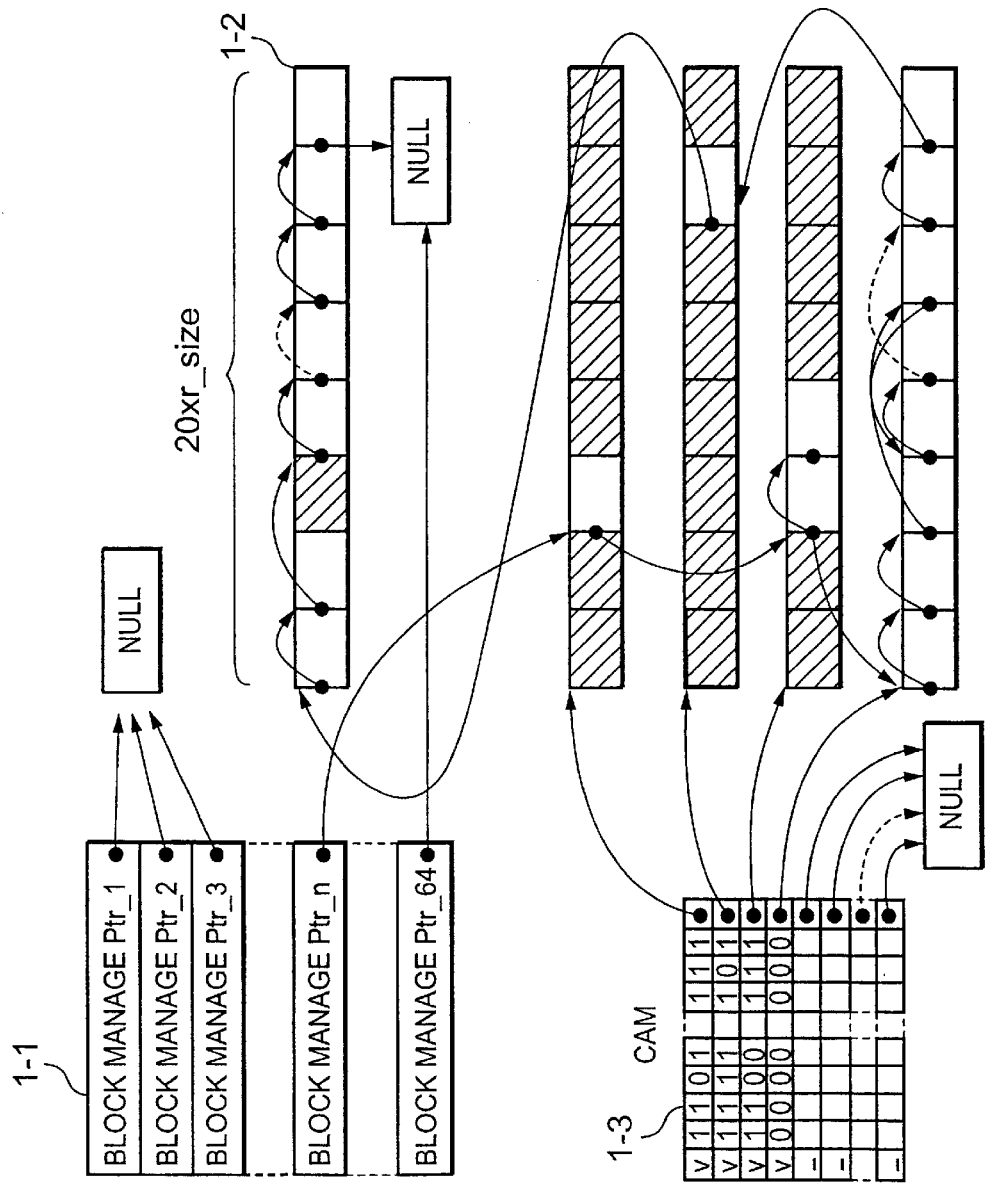
FIG. 8 is a diagram illustrating the state wherein all the fields in a block are free.

Now with reference to FIG. 1, a search trigger is supplied from the timer 17 at preset intervals of time, and this search trigger is provided to the search control machine 16. The search control machine 16, in response to the search trigger, searches the CAM 11 via a searching port. More specifically, the search control machine 16 confirms the unlocking of the block by searching flags of the CAM 11 with respect to the once locked block and the state of use of fields therein. For instance, the search control machine 16 periodically (every time it receives a search trigger) searches for any valid block all of whose fields are free by using VALID state flags and used/free flags as search keys. When any such block is found existing, its address is given to the area releasing module 13 as an address available for unlocking. The area releasing module 13 unlocks the pertinent block in accordance with the identified address (FIG. 8 illustrates a state in which all the fields in a block have become free).

By checking the presence of any block in condition for unlocking periodically by using the search function of the CAM in this manner, it is made possible to find such blocks at very high speed.

In the above-described example, blocks were searched at prescribed intervals. This example is not the only feasible one, but blocks may be searched every time an area is acquired or unlocked (returned to a free state). A conceivable alternative is such that, for instance, a controlling unit (e.g., a processor) monitors for free areas in the shared memory space, and when any free area drops below a prescribed capacity, the controlling unit gives a trigger to the area releasing module to have the memory unlocked (i.e., it is also acceptable to search flags in the content addressable memory and decides whether or not a locked memory space is to be unlocked according to the stage of the pertinent flag). Or, memory unlocking may be accomplished every time a shared memory space is accessed (i.e. flags in the content addressable memory are searched every time a shared memory space is accessed and it is decided whether or not a locked memory space is to be unlocked according to the stage of the pertinent flag).

Incidentally, the memory control circuit illustrated in FIG. 1 is operating independently of locking of an area by a task (process). By providing a circuit for area unlocking as shown in FIG. 1, the processing load on the task (process) can be reduced.

Figure 9:
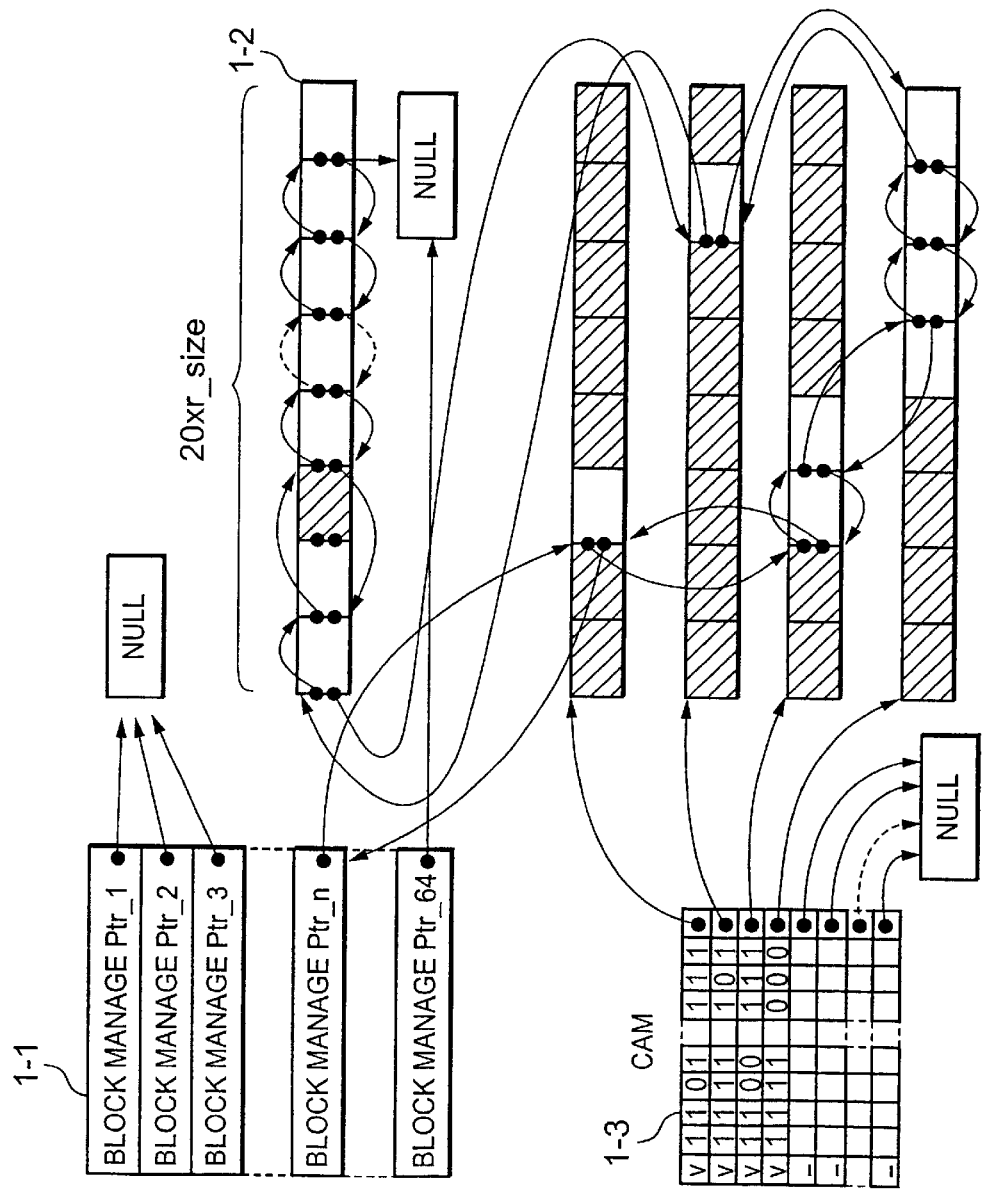
FIG. 9 is a diagram illustrating another method of memory pool management in the memory pool control circuit according to the present invention.

Next will be described another example (of operation) of the memory control circuit according to the invention with reference to FIG. 9. In the configuration of FIG. 9, there is a pointer indicating the next tree field within the block subject to area locking but also a pointer indicating the field before its own field was pointed to. Updating of this pointer is accomplished at the same time as the updating of the aforementioned pointer. Thus in each field there are used a pointer indicating the next free field and another pointer indicating the field before. This enables the destination of the pointer transfer to be determined simply, when actual unlocking is to be accomplished after a block available for unlocking has been found by the searching function of the CAM, without having to searching the list, and accordingly helps save the time required for unlocking.

Figure 10:
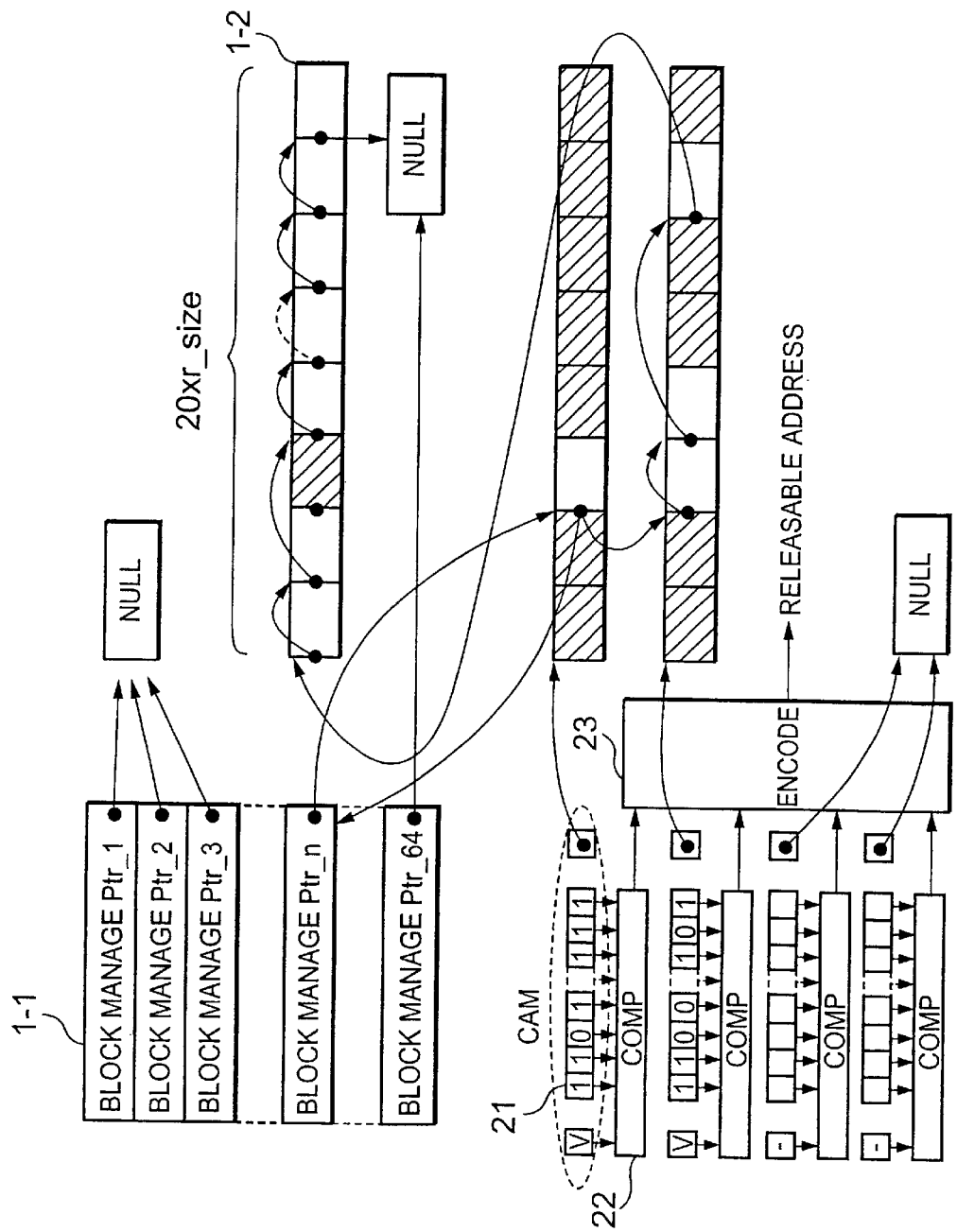
FIG. 10 is a diagram illustrating still another method of memory pool management in the memory pool control circuit according to the invention.

FIG. 10 illustrates another example of the memory pool control circuit according to the invention. In the configuration shown in FIG. 10, a register 21, a comparator (Comp) 22 and an encoder (Encode) 23 are used in place of the CAM 11. In the register 21, configured in the same way as the CAM, is registered a flag whether a pertinent word is valid or invalid. The comparator 22 supplies a flag indicating whether each field in the flag is being used or free according to the content of the register 21. The encoder 23 supplies as a releasable address a pointer indicating the position of the actual memory space corresponding to the flag indicated by the pertinent word. Thus the comparator 22 determines whether or not the pertinent word is valid and, with respect to all the fields in the block, whether they are being used or free, the result of determination being provided to the encoder 23. The encoder 23 encodes the pertinent word to supply a releasable address.

Incidentally, by hierarchically using the memory management method according to the invention, not only can a memory pool be managed with a large-scale unit, but also memory management can be accomplished in finer units.

As hitherto described, the present invention uses a CAM for the management of a shared memory. As a result, it is possible to check at very high speed, where a plurality of fixed length fields are put together into a single unit block and an area is locked for each block, whether or not a locked block may be unlocked by using the searching function of the CAM. As a result, there is no need to lock memory spaces wastefully, resulting in the benefit of efficiently using memory spaces by unlocking locked areas once they have come out of use.

Furthermore, since memory spaces can be unlocked in predetermined units, any need for a large capacity memory space can be adequately need to permit hierarchical memory management, resulting in the benefit of enabling memory areas to be managed in a plurality of kinds of units.

While this invention has been described with reference to certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A memory pool control circuit for managing a shared memory divided into memory spaces each having a predetermined plurality of fields, comprising:
   a content addressable memory having a plurality of words each corresponding to one of the memory spaces, each said word comprising a validity flag indicating whether a respective word is valid, a usage flag corresponding to each said field in a corresponding said memory space, and a pointer indicating a location of the memory space represented by the word;
   an area securing circuit for locking said memory space in compliance with an access to said shared memory and updating the pointers in said content addressable memory;
   a local access circuit for setting the flags in said content addressable memory according to the state of use of the fields in said locked memory space; and
   an area releasing circuit for searching said content addressable memory and unlocking said locked memory space when all the fields therein are found free based on settings of the usage flags and the validity flag in the word corresponding to the locked memory space.

2. The memory pool control circuit, as claimed in claim 1, wherein:
   said area securing circuit accesses said content addressable memory when locking said memory space, and updating the leading pointer of each field in said locked memory space to indicate the next field.

3. The memory pool control circuit, as claimed in claim 1, wherein:
   said local access circuit sets the validity flag in one said word in said content addressable memory when setting one of the usage flags in said content addressable memory, and writing the address of the initial position of said locked memory space into a pointer field in said one word.

4. The memory pool control circuit, as claimed in claim 3, wherein:
   said local access circuit, when said memory space is unused, inserts the unused field into the initial position of a list structure managing free fields.

5. The memory pool control circuit, as claimed in claim 4, wherein:
   said local access circuit turns the usage flag of the pertinent field on said content addressable memory into a free state.

6. The memory pool control circuit, as claimed in claim 1, wherein:
   said area releasing circuit searches the usage and validity flags of said content addressable memory at predetermined intervals, and determines whether or not to unlock said secured memory space according to the state of said usage and validity flags.

7. The memory pool control circuit, as claimed in claim 1, wherein:
   said area unlocking circuit searches the usage and validity flags of said content addressable memory in accordance with triggers provided from a controlling apparatus, and determines whether or not to unlock said locked memory space according to the state of said usage and validity flags.

8. The memory pool control circuit, as claimed in claim 1, wherein:
   said area releasing circuit searches the usage and validity flags of said content addressable memory every time said shared memory is accessed, and determines whether or not to unlock said locked memory space according to the state of said usage and validity flags.

9. A memory pool control method for managing a shared memory divided into memory spaces each having a predetermined plurality of fields, comprising:
   providing a content addressable memory having a plurality of words each corresponding to one of the memory spaces, each said word comprising a validity flag indicating whether a respective word is valid, a usage flag corresponding to each said field in a corresponding said memory space, and a pointer indicating a location of the memory space represented by the word;
   upon occurrence of an access to one of the memory spaces in said shared memory, locking the accessed memory space and updating one of said pointers in a word corresponding to the locked memory space in the content addressable memory to identify the locked memory space;
   updating said usage flags in the word corresponding to the locked memory space in said content addressable memory according to the state of use of fields in said locked memory space; and
   unlocking said locked memory space when all the fields therein are found free after searching said usage and validity flags.

10. The memory pool control method, as claimed in claim 9, wherein:
said unlocking includes updating, when said memory space is locked, an initial pointer of each field in said locked memory space to indicate a next field.

11. The memory pool control method, as claimed in claim 9, wherein:
said unlocking includes searching the flags of said content addressable memory at predetermined intervals, and determining whether or not to unlock any of said memory spaces currently in a locked state according to the state of the pertinent flag.

12. The memory pool control method, as claimed in claim 9, wherein:
said unlocking includes searching the flags of said content addressable memory in accordance with triggers provided from a controlling apparatus, and determining whether or not to unlock any of said memory spaces currently in a locked state according to the state of said flags.

13. The memory pool control method, as claimed in claim 9, wherein:
said unlocking includes searching the flags every time said shared memory is accessed, and determining whether or not to unlock any of said memory spaces currently in a locked state according to the state of said flags.

* * * * *